US010429037B2

(12) United States Patent
Wheatley et al.

(10) Patent No.: US 10,429,037 B2
(45) Date of Patent: Oct. 1, 2019

(54) OPTICAL DEVICE INCLUDING SWITCHABLE DIFFUSER

(71) Applicant: 3M INNOVATIVE PROPERTIES COMPANY, St. Paul, MN (US)

(72) Inventors: John A. Wheatley, Lake Elmo, MN (US); Guanglei Du, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

(21) Appl. No.: 15/524,837

(22) PCT Filed: Nov. 5, 2015

(86) PCT No.: PCT/US2015/059259
§ 371 (c)(1),
(2) Date: May 5, 2017

(87) PCT Pub. No.: WO2016/073731
PCT Pub. Date: May 12, 2016

(65) Prior Publication Data
US 2017/0343189 A1 Nov. 30, 2017

Related U.S. Application Data

(60) Provisional application No. 62/076,926, filed on Nov. 7, 2014.

(51) Int. Cl.
*F21V 11/00* (2015.01)
*F21V 14/00* (2018.01)
(Continued)

(52) U.S. Cl.
CPC ............ *F21V 14/003* (2013.01); *F21V 7/048* (2013.01); *F21V 7/05* (2013.01); *F21V 7/22* (2013.01);
(Continued)

(58) Field of Classification Search
CPC .......... F21V 14/003; F21V 7/048; F21V 7/05; F21V 7/22; F21V 13/02; G02B 5/02; G02B 5/045
(Continued)

(56) References Cited

U.S. PATENT DOCUMENTS

| 4,570,204 A | 2/1986 | Caimi |
| 5,424,927 A | 6/1995 | Schaller |

(Continued)

FOREIGN PATENT DOCUMENTS

| EP | 2629132 | 8/2013 |
| JP | 3831744 B1 | 10/2006 |

(Continued)

OTHER PUBLICATIONS

L & W Optical properties of Water, p. 61-67; data reproduced from "Optical Properties of Water" by C.D. Mobley in Hanbook of Optics Second Edition McGraw-Hill 1994 (Year: 1994).*

(Continued)

*Primary Examiner* — Matthew J. Peerce
(74) *Attorney, Agent, or Firm* — Michael Stern (57) ABSTRACT

Optical devices are disclosed. In particular, optical devices including a collimated light source (140), at switchable diffuser (110), and at least one light deflecting element (120, 130) are disclosed. The electrically switchable diffuser (110), in combination with the at least light deflecting element (120, 130) can provide significant changes in the overall distribution of light at the electrically switchable diffuser (110) is switched between two or more states.

9 Claims, 5 Drawing Sheets

(51) Int. Cl.
*F21V 7/04* (2006.01)
*F21V 7/05* (2006.01)
*F21V 7/22* (2018.01)
*F21V 13/02* (2006.01)
*G02F 1/1334* (2006.01)
*G02B 5/02* (2006.01)
*G02B 5/04* (2006.01)

(52) U.S. Cl.
CPC ............... *F21V 13/02* (2013.01); *G02B 5/02* (2013.01); *G02B 5/045* (2013.01); *G02F 1/1334* (2013.01)

(58) Field of Classification Search
USPC .................................................. 362/123, 355
See application file for complete search history.

(56) References Cited

U.S. PATENT DOCUMENTS 7,658,528 B2 * 2/2010 Hoelen ............... F21V 5/04
359/665
9,188,774 B2 * 11/2015 Jung ................ G02B 26/02

2005/0259193 A1 11/2005 Sumiyoshi
2005/0265029 A1 12/2005 Epstein
2006/0256244 A1 11/2006 Jak
2011/0255163 A1 10/2011 Merrill
2016/0047530 A1 * 2/2016 Rodriguez .............. F21V 7/048
362/297

FOREIGN PATENT DOCUMENTS

| JP | 2007-085781 A | 4/2007 |
| JP | 2011-197537 | 10/2011 |
| WO | WO 98-23996 | 6/1998 |
| WO | WO 2008-139383 | 11/2008 |
| WO | WO 2009-087587 | 7/2009 |
| WO | Wo 2011-125392 | 10/2011 |
| WO | WO 2014-064582 | 5/2014 |

OTHER PUBLICATIONS

International Search Report for PCT International Application No. PCT/US2015/059259, dated Feb. 2, 2016, 6 pages.

* cited by examiner

OPTICAL DEVICE INCLUDING SWITCHABLE DIFFUSER

CROSS REFERENCE TO RELATED APPLICATIONS

This application is a national stage filing under 35 U.S.C. 371 of PCT/US2015/059259, filed Nov. 5, 2015, which claims the benefit of U.S. Provisional Application No. 62/076,926, filed Nov. 7, 2014, the disclosure of which is incorporated by reference in their entirety herein.

BACKGROUND

Lamps and luminaires are used for general ambient illumination and task lighting. Also, in some cases they may be used for safety, signage, navigation, or decorative purposes. Switchable diffusers are typically electrically driven films or layers that are capable of switching at least a portion from a generally clear to a generally hazy state.

SUMMARY

In one aspect, the present disclosure relates to an optical device. The optical device includes an electrically switchable diffuser capable of having at least a first state and a second state, at least one light deflecting element disposed proximate the electrically switchable diffuser, and a collimated light source disposed proximate to the electrically switchable diffuser. The collimated light source, in a powered state, is configured to produce an input light cone having a central optical axis and having a minimum angular width of not more than about 40 degrees. At least a portion of the light from the collimated light source is incident on the light deflecting element when the electrically switchable diffuser is in the second state but not the first state. In some embodiments, the first state is a clear state. In some embodiments, the collimated light source is configured to produce an input light cone having no angular width more than about 40 degrees. In some embodiments, the electrically switchable diffuser and the at least one light deflecting element are not parallel. In some embodiments, the electrically switchable diffuser includes smectic A. In some embodiments, at least a portion of the electrically switchable diffuser is curved. In some embodiments, at least a portion of the at least one light deflecting element is curved. In some embodiments, the at least one light deflecting element includes a microstructured surface, a reflector, or a diffuser.

In another aspect, the present disclosure relates to an optical device. The optical device includes an electrically switchable diffuser capable of having at least a first state and a second state, a substantially planar light deflecting element disposed proximate the electrically switchable diffuser, and a collimated light source disposed proximate to the electrically switchable diffuser and opposite the light deflecting element. The collimated light source, in a powered state, is configured to produce an input light cone having a central optical axis and an angular width of not more than about 40 degrees. The light deflecting element includes a central portion with a minimum radius r, measured from the central optical axis to an edge of the central portion and an outer portion not including the central portion. The light deflecting element is disposed at a distance l from the switchable diffuser, measured along the central optical axis. The outer portion redirects incident light but the central portion is substantially non-redirecting for light from the collimated light source incident on the at least one light deflecting element, and l is greater than or substantially equal to r. In some embodiments, the central portion includes air. In some embodiments, l is greater than or substantially equal to 2r. In some embodiments, the outer portion of the light deflecting element is proximate the entire outer edge of the light deflecting element. In some embodiments, the optical device further includes a second outer portion not including the outer portion nor the central portion, wherein the second outer portion redirects incident light from the collimated light source.

In yet another aspect, the present disclosure relates to an optical device. The optical device includes an electrically switchable diffuser capable of having at least a first state and a second state, a substantially planar light deflecting element disposed proximate the electrically switchable diffuser, and a collimated light source disposed proximate to the electrically switchable diffuser and opposite the light deflecting element. The collimated light source, in a powered state, is configure to produce an input light cone having a central optical axis and an angular width of not more than about 40 degrees. The light deflecting element includes a central portion and at least one outer portion not including the central portion, the central portion and the at least one outer portion at least partially sharing a boundary. There is an abrupt change in light deflection of light incident on the light deflecting element from the collimated light source between the central portion and the at least one outer portion at the boundary. In some embodiments, an abrupt change in light deflection means there is a discontinuous change in light scattering. In some embodiments, an abrupt change in light deflection means there is a discontinuous change in light deflecting direction relative to the central optical axis. In some embodiments, an abrupt change in light deflection means there is a discontinuous change of more than 10 degrees in the angle of deflection. In some embodiments, an abrupt change in light deflection means there is a discontinuous change of more than 30 degrees in the angle of deflection. In some embodiments, an abrupt change in light deflection means there is a discontinuous change of more than 10% in reflectivity. In some embodiments, an abrupt change in light deflection means there is a discontinuous change of more than 50% in reflectivity.

DETAILED DESCRIPTION

Luminaires and other illumination devices are of interest for both functional and aesthetic reasons. For example, a highly focused task light may enable visibility during a medical procedure or within a dark environment with dim ambient lighting while a more diffuse luminaire may provide general purpose lighting for a workspace or a room. Likewise, different distributions of light may provide interesting or useful effects, or direct a viewer's attention toward or away from a specific object. In some applications, it may be desirable to be able to switch between different styles and distributions in real time; that is, without the need to disassemble, reconfigure, and reassemble light fixtures, physically manipulate the lamp, or provide and install additional components.

While switchable diffusers are a potential solution, these electrically switchable solutions have difficulty achieving a high degree of haziness. Therefore, a collimated light source directly illuminating a switchable diffuser generally has only a slight effect on the ultimate output distribution of the lighting device. In other words, an input distribution will not be significantly affected (broadened) by a switchable diffuser's hazy state. While this may be sufficient in some applications, more drastic, noticeable, or striking changes in a lamp's illumination profile may be useful for particular applications or provide interesting and dynamic effects.

In certain embodiments, the disclosed optical device includes a switchable diffuser and subsequent light deflecting elements. These light deflecting elements may significantly deviate light from its previous path. In combination with a switchable diffuser, the light deflecting elements may enable major changes in the appearance of the light distribution of a lamp or luminaire beyond the transition between a hazy and clear state. As an example, in switching from one state to another state, this combination may illuminate a region of the environment (such as a portion of a wall or an object) that was previously not illuminated.

Figure 1A:
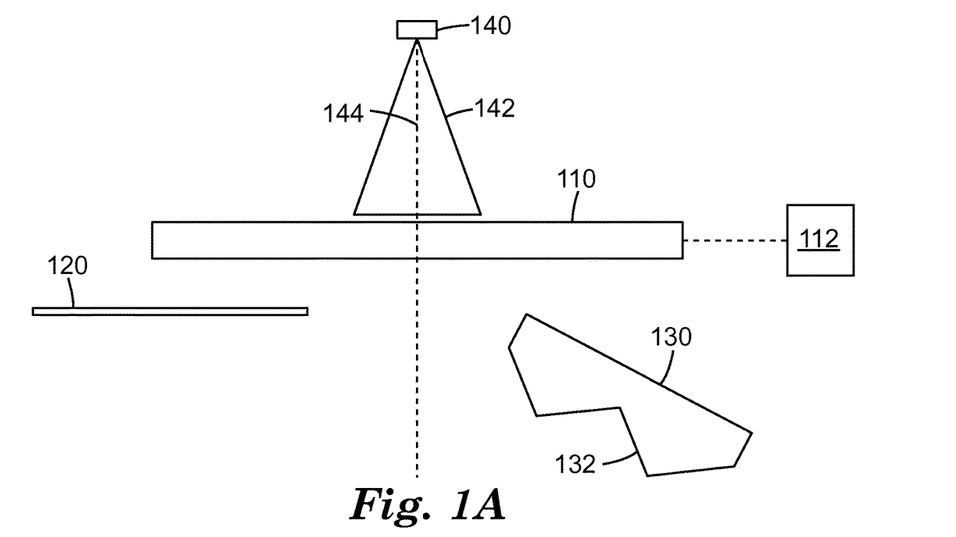
FIG. 1A is a schematic elevation view of an optical device.

FIG. 1A is a schematic elevation view of an optical device. The optical device includes switchable diffuse 110, control mechanism 112, first light deflecting element 120, second light deflecting element 130 including microstructure 132, and collimated light source 140 generating input light cone 142 having central optical axis 144.

Switchable diffuser 110 may be any suitable material and any suitable three-dimensional shape, with any suitable size. In some embodiments, switchable diffuser 110 may be an electrically switchable diffuser. Electrically switchable diffusers generally include an active material sandwiched between structurally supporting material, such as a polymer or glass. In some embodiments, these structurally supporting materials may further include electrically active layers such as transparent conductors or electrodes. In some embodiments, the structurally supporting material may be chosen from a suitable material set or have a suitable thickness to allow the overall switchable diffuser to be flexible or deformable (also enabling curved or faceted shapes). The active material may be or include a liquid crystal material. In some embodiments, the active material may be or include polymer dispersed liquid crystal (PDLC). Polymer dispersed liquid crystal appears hazy and diffuses light unless it is provided with a voltage differential. In the presence of a sufficiently strong electric field, the polymer dispersed liquid crystal material aligns along the field lines, providing a substantially clear state and appearance with relatively lower scattering of light. In some embodiments, the active material includes smectic A liquid crystal. Smectic A can be switched from clear to hazy by providing different voltage waveforms (e.g., sine wave, square wave) having appropriate frequency. In some embodiments, the frequencies for providing a hazy state and a clear state are significantly different. In some embodiments, the active material is bistable. By bistable, for purposes for this application, it is meant that both a hazy state and a clear state are maintainable over an appropriate, application-dependent amount of time without the continuous application of voltage or electrical signals. In some applications, bistability on the order of minutes or hours may be sufficient. In other applications, for example outdoor signage or road safety applications, it may be desirable to have bistability on the order of days, weeks, months, or even years.

In some embodiments, the active material of the switchable diffuser may be capable of intermediate hazy states. This may be a single intermediate state of haziness (between a maximum and minimum haziness state) or an array of arbitrary haziness states along a continuum between minimum and maximum haziness. In some embodiments, elements of the active material of the switchable diffuser may be individually addressable. This includes embodiments where shaped segments are treated differently to embodiments where a grid configuration provides pixilated control over the areal extent of the switchable diffuser. A combination of these features may provide for patterned hazy states that result in an interesting or useful off-state or inactive state display, provided the switchable diffuser is visible to a viewer. For example, the switchable diffuser may display a hazy version of a trademark or logo (in positive or negative space; i.e., with either the clear or hazy value assigned to the trademark), or other information, such as the current time or date.

Haziness, or haze, may be characterized the percent of transmitted light that is scattered so that its direction deviates more than 2.5 degrees from the direction of the incident beam as specified in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.). In some embodiments, the switchable diffuser may have a haze of less than 5% in the clear state, or even less than 1%. In some embodiments, the hazy state of the switchable diffuser may be greater than 50%, 80%, 90%, 95%, or even 99%. Note that substrates that provide the same or similar measured haze values may have very different light distributions.

Control mechanism 112 represents any combination of electrical components that are used to control the switching of switchable diffuser 110. Control mechanism 112 may include transformers, microprocessors, and means for receiving data, such as an antenna. Control mechanism 112 is illustrated schematically in FIG. 1A (and throughout the figures in this description) for ease of illustration. Control mechanism 112 includes any conductive wires, leads, or electrodes for providing electrical signals to switchable diffuser 110. Control mechanism 112 may further include any external components used in conjunction with the optical device in order to provide switching functionality to switchable diffuser 110.

Figure 1B:
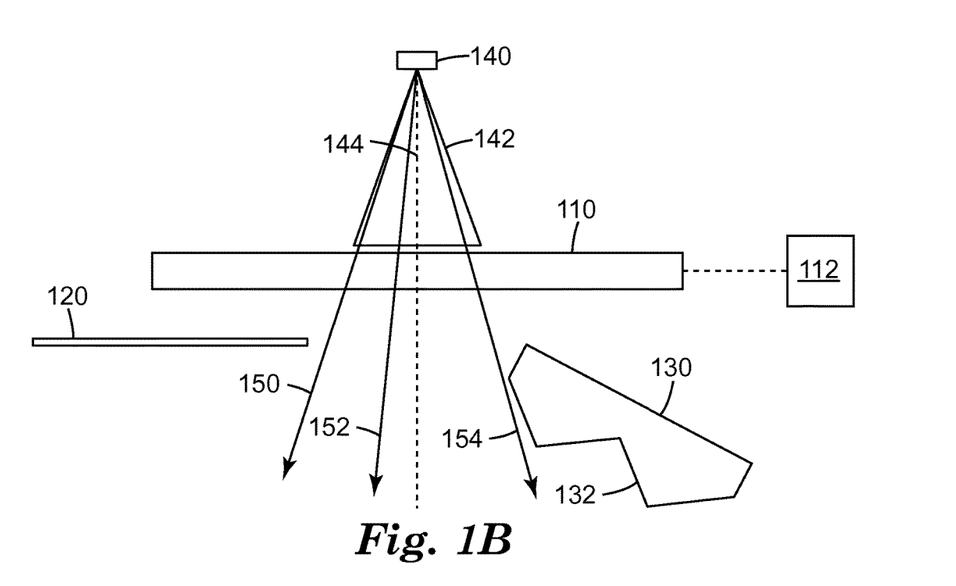
FIG. 1B is a schematic elevation view of the optical device of FIG. 1A in a clear state.
Figure 1C:
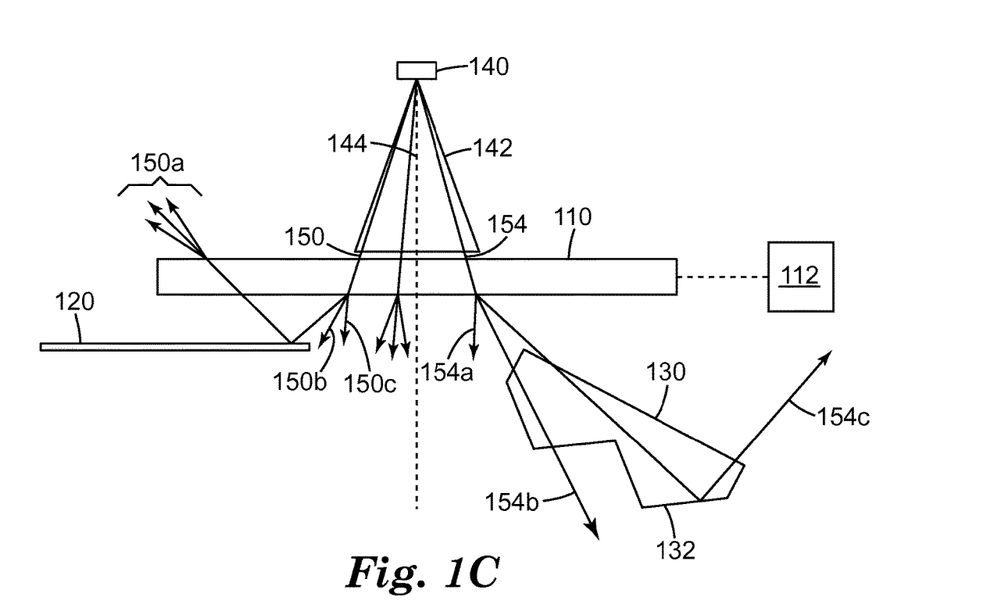
FIG. 1C is a schematic elevation view of the optical device of FIG. 1A in a hazy state.

First light deflecting element 120 may be any suitable shape, any material, and may serve virtually any optical function. As shown in FIGS. 1A-1C, first light deflecting element 120 is a reflective element, but many other optical functionalities (and, accordingly, materials, elements, and combinations of elements) are possible. For example, first light deflecting element 120 may be or include a diffuse, specular, or semi-specular reflector, partial reflector, transflector, an absorbing, reflective, or absorbing/reflective polarizer, a downconverting material or quantum dots, a color filter or pigment, a louver or light control film, a volume/bulk or surface diffuser including diffusers having an engineered or holographically replicated surface, a lens or collimating refractive optic, a diverging lens, a microstructured surface or microstructured film such as a prism film, a turning film, or other suitable optical elements. Some elements may be perforated, striped, or otherwise spatially variant: for example, the reflectivity of first light deflecting element 120 may vary across its length. For example, light deflecting element 120 may be a multilayer reflective film that is selectively heated through application of light or radiant energy to portions of the film in order to reduce or eliminate the birefringence in those portions, which can decrease or even substantially eliminate reflectivity in those portions. Such films are described in U.S. Patent Publication No. 2011/0255163 (Merrill et al.). For purposes of this description, however, an optically transparent substrate, without other optical functionality, is not considered a light redirecting element.

First light deflecting element 120 may be positioned or configured in order to provide appropriate light distributions for the desired application. For example, first light deflecting element 120 may be partially or entirely curved or faceted, it may be parallel or perpendicular to a plane of the switchable diffuser, or it may have any orientation in between. It may be spaced at any suitable distance from the surface of the switchable diffuser and in some embodiments may extend beyond the areal extent of the switchable diffuser. In other words, the projection of the switchable diffuser onto first light deflecting element or vice versa may only partially overlap.

Second light deflecting element 130 is depicted in the embodiment of FIG. 1A as a light redirecting or prismatic film including a plurality of microstructure 132. Second light deflecting element 130 may be or include the same optical elements as first light deflecting element 120, or they may be different. Depending on the application, the first and second light deflecting elements may be positioned or configured similarly, symmetrically, or asymmetrically. In some embodiments, more than two light deflecting elements are possible.

Collimated light source 140 produces light input cone 142 having central optical axis 144. In some embodiments, input light cone 142 has dimension with an angular width no more than 40 degrees. In some embodiments, input light cone 142 has no angular width greater than 40 degrees. Depending on the application, degrees of greater collimation (or narrower angular widths) may be desirable. The angular width may be measured as a full width half maximum (FWHM) value. In some embodiments, the collimated light source may be characterized by not more than 30%, 20%, or 10% of the power or luminance from the collimated light source may being outside of a cone with a angular width of 40 degrees, 35 degrees, 30 degrees, or any suitable degree of collimation. Collimated light source 140 may be any light source or combination of light sources, including light emitting diodes (LEDs) emitting at any wavelength or combination of wavelengths or providing any desired spectral power distribution. In some embodiments, collimated light source 140 may emit substantially white light. In some embodiments, collimated light source 140 may approach the spectrum of a radiating blackbody at a temperature between 3000K and 6000K, for example. In some embodiments, the collimated light source may have a tunable color temperature. Collimating optics may be included to provide a light cone with desired characteristics. While referred to in this application as a light input cone, other shapes may be possible, including elliptical, annular, and polygonal (through, for example, the use of masks). Central optical axis 142 is determined for the distance between the collimated light source and the switchable diffuser and then extended through the optical device.

FIG. 1B is a schematic elevation view of the optical device of FIG. 1A in a clear state. FIG. 1B corresponds to FIG. 1A except that exemplary rays 150, 152, and 154 are shown. For simplification of illustration, all of switchable diffuser 110 is treated as in a clear state, although as explained elsewhere in this description, some portions may be in a hazy state while some portions are in a clear state.

Exemplary rays 150, 152, and 154 are each incident on switchable diffuser and pass through without being redirected. For purposes of this disclosure, Fresnel reflections due to the change in index of refraction are ignored (although they may be reduced by antireflective surface coatings or structures, such as moth's eye structures), as are the minor effects on the ray from passing through and being refracted by a higher index substrate. Note that none of exemplary rays 150, 152, and 154 are incident on either first light deflecting element 120 or second light deflecting element 130.

FIG. 1C is a schematic elevation view of the optical device of FIG. 1A in a hazy state. As in FIG. 1B, FIG. 1C corresponds to FIG. 1A and FIG. 1B and treats the entirety of switchable diffuser 110 as hazy. Ray 150 is now scattered by the haziness of switchable diffuser 110 into rays 150a, 150b, and 150c. Rays 150b and 150c still pass unimpeded after exiting switchable diffuser 110, and later may be output light, ultimately providing ambient illumination. Ray 150a, however, is now incident on first light deflecting element 120, which in this exemplary embodiment is a specular reflector. Ray 150a is reflected by first light deflecting element 120 and passes back through switchable diffuser 110, further scattering ray 150a. Some configurations may utilize different relative sizes and positioning of first light deflecting element 120 and switchable diffuser 110 such that the reflected light does not pass through the switchable diffuser a second time. These considerations may be taken into account depending on the desired light output and aesthetic effect.

Ray 154 passes through switchable diffuser 110 in its hazy state and is scattered into rays 154a, 154b, and 154c. Ray 154a is not incident on either of the light deflecting elements. Ray 154b is incident on second light deflecting element 130, and in particular microstructure 132, however, due to the prism geometry and the angle of incidence, it is not significantly redirected by second light deflecting element 130. Ray 154c, however, is totally internally reflected by the interface between air and one of microstructure 132 and is redirected upwards. The configuration shown in FIGS. 1A-1C provides an example of an optical device where at least a portion of the light from the collimated light source is incident on at least one of the light deflecting elements in a hazy state but not a clear state. The configuration provides for very different light output angles as a function of haziness imparted by the switchable diffuser and the overall configuration of the system.

Figure 2A:
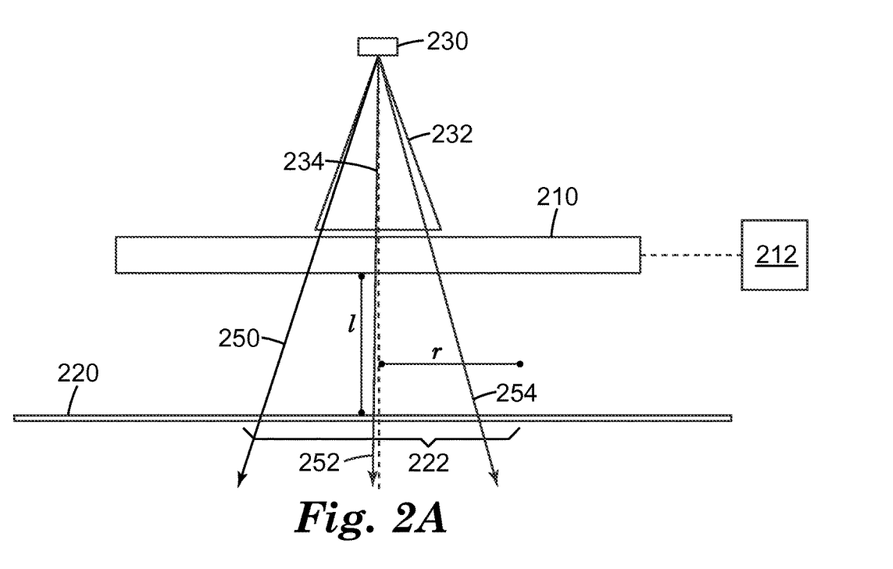
FIG. 2A is a schematic elevation view of another optical device in a clear state.

FIG. 2A is a schematic elevation view of another optical device in a clear state. The optical device includes switchable diffuser 210, control mechanism 212, light deflecting element 220 having central portion 222, and collimated light source 230 generating input light cone 232 having central optical axis 234. Exemplary rays 250, 252, and 254 are also shown.

Figure 2B:
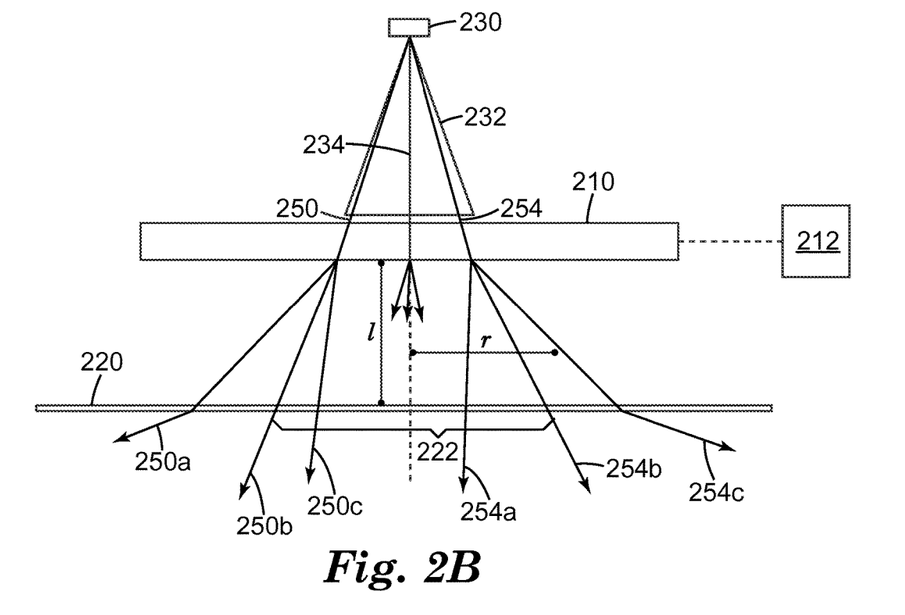
FIG. 2B is a schematic elevation view of the optical device of FIG. 2A in a hazy state.

The embodiments depicted in FIGS. 2A-2B differ from those in FIGS. 1A-1C in that a single light deflecting element is at least coextensive with switchable diffuser 210.

In other words, the projection of light deflecting element 220 extends beyond switchable diffuser 210.

Light deflecting element 220 is characterized by a central portion 222 that is substantially non-redirected for light incident on light deflecting element 220 from collimated light source 240. In some embodiments, substantially non-redirecting means that light, on average, is not redirected by more than 10 degrees from its previous path. In some embodiments, this means that light, on average, is not redirected by more than 5 degrees. In some embodiments, central portion 222 is simply transparent plastic or even may be simply air (in other words, that light deflecting element 220 has an annular or donut shape), resulting in negligible redirection of light.

Light deflecting element 220 also has an outer portion not including central portion 222, where light deflecting element 220 does substantially redirect light incident on it from collimated light source 240. In some embodiments, and in contrast to central portion 222, this means that light is, on average, redirected by more than 10 degrees. Light deflecting element should have a discernable boundary between central portion 222 and the outer portion. The minimum distance between the intersection of central optical axis 234 and light deflecting element 220 and the boundary between central portion 222 and the outer portion, measured along an axis perpendicular to the central optical axis, is r. Sometimes, the intersection of central optical axis 234 and light deflecting element 220 will be the same or substantially equal to the geometric center of the light deflecting element, although this need not be the case. In embodiments where the light deflecting element includes a hole, the intersection may be considered to be with the plane of the light deflecting element. In embodiments where a plane may be difficult or impossible to define, the intersection may be calculated along the optical axis for locations where a value for r exists, and the largest one may be used. The distance between switchable diffuser 210 and light deflecting element 220 along central optical axis 234 is l. In some embodiments, l is substantially equal to r. In some embodiments, l is greater than or substantially equal to 2r.

Each of rays 250, 252, and 254 are incident on switchable diffuser 210, which is in a clear state. Accordingly, the rays are not noticeably scattered. Each of rays 250, 252, and 254 are next incident on central portion 222 of light deflecting element 220, and are not substantially redirected. Thus, in the clear state, the relatively narrow light cone from collimated light source 230 is preserved through the switchable diffuser and the central portion of the light deflecting element.

FIG. 2B is a schematic elevation view of the optical device of FIG. 2A in a hazy state. In this state, the rays including rays 250 and 254 are scattered passing through switchable diffuser 210 in a hazy state. Ray 250 is scattered into 250a, 250b, and 250c, and while 250b and 250c pass through central portion 222 of light deflecting element 220 and are not substantially redirected, ray 250a is now turned by the redirecting outer portion of light deflecting element 220. While the particular structure of light deflecting element 220 is not important, the outer portion of light deflecting element 220 may include a microreplicated structure, such as prisms, lenslets, or other faceted or curved shapes in order to impart a light redirecting effect. In other embodiments, light deflecting element 220 may include a surface or volume/bulk diffuser. In some embodiments, light deflecting element 220 may include a printed diffuser; i.e., a substrate with printed dots to provide a desired scattering effect.

Likewise, ray 254 is scattered when passing through switchable diffuser 210 into ray 254a, 254b, and 254c. Rays 254a and 254b are still incident on central portion 222 of light deflecting element 220 and therefore pass through without being substantially redirected. Ray 254c, however, is incident on the outer portion of light deflecting element 220 and therefore is redirected by the light deflecting element. Through this combination of switchable diffuser 210 and light deflecting element 220, it is possible to design optical devices such as lamps and luminaires that have significantly different light output distributions: more than a switchable diffuser would be able to bring about by itself.

Figure 3:
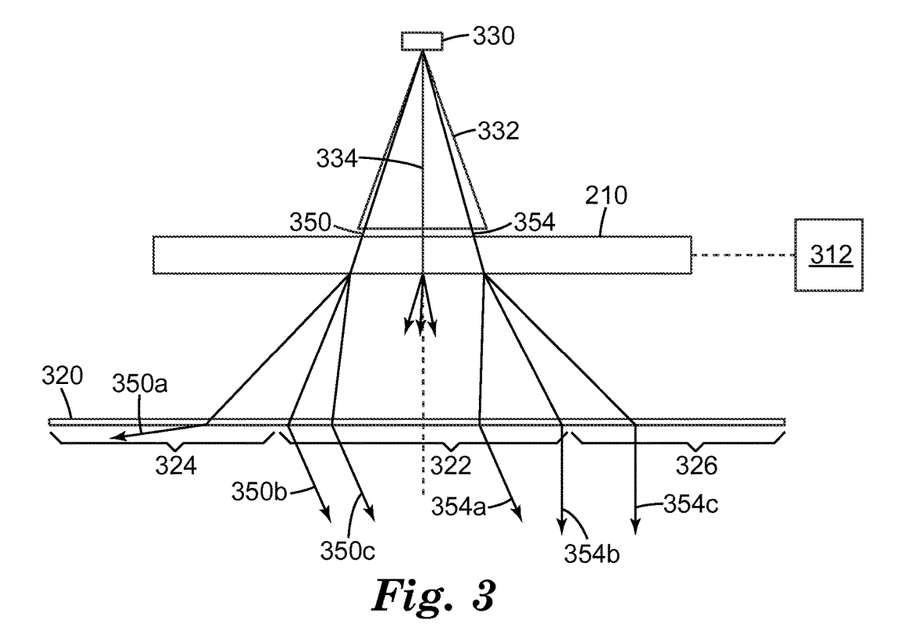
FIG. 3 is a schematic elevation view of another optical device in a hazy state.
Figure 4A:
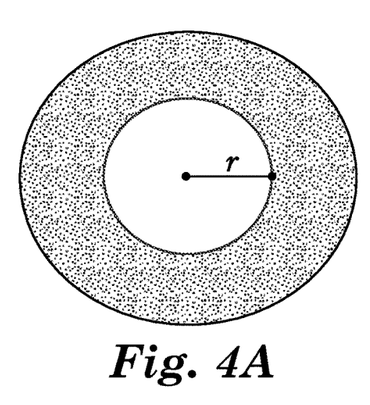
FIGS. 4A-4D are a series of top plan views of exemplary light deflecting elements.
Figure 4B:
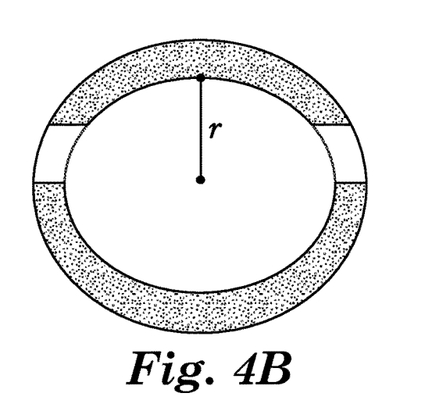
Figure 4C:
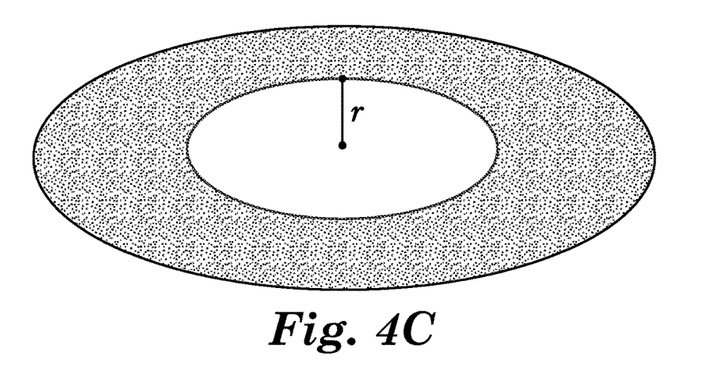
Figure 4D:
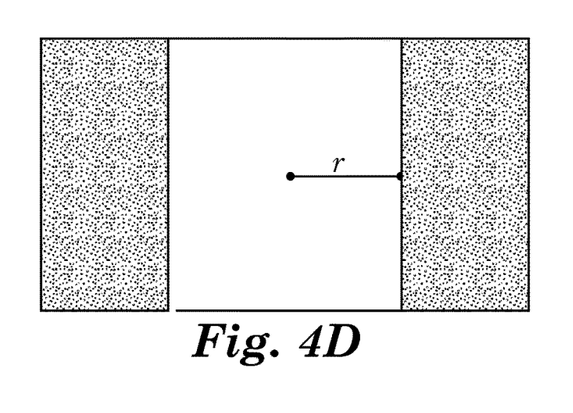
Figure 5A:
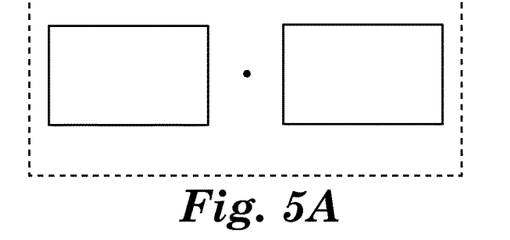
FIGS. 5A-5D are a series of top plan views of exemplary configurations of light deflecting elements in an optical device.
Figure 5B:
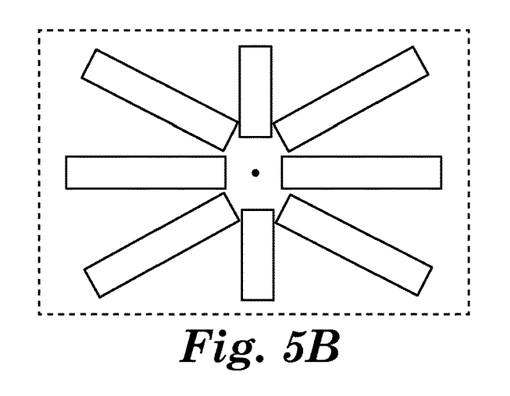
Figure 5C:
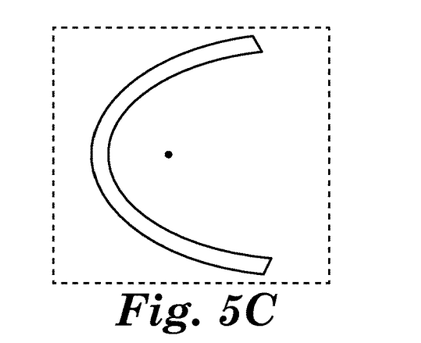
Figure 5D:
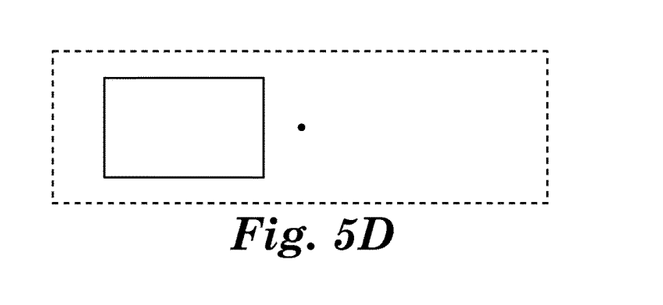

FIG. 3 is a schematic elevation view of another optical device in a hazy state. As in FIGS. 2A-2B, the optical device includes switchable diffuser 310, control mechanism 312, and light deflecting element 320, however light deflecting element 320 has central portion 322, first outer portion 324, and second outer portion 326. The optical device further includes collimated light source 330 producing input light cone 332 having central optical axis 334.

In some embodiments, there may be more than two outer portions of light deflecting element 320. In some embodiments, there may be one outer portion, with the central portion occupying the space designed as the second outer portion in FIG. 3, for example. The embodiment illustrated in FIG. 3 may differ from that in FIGS. 2A-2B because central portion 322 may be redirecting for light incident on it from collimated light source 340. However, in these cases there is still an abrupt change or discontinuity between central portion 322 and the outer portions. In some embodiments, this means that a small change in the incidence location results in a large magnitude change in how the light is redirected. In some embodiments, this means that there is a discontinuous change in optical characteristics or performance; for example, central portion 322 may be optically transparent while an outer portion may have high haze. Likewise, central portion 322 may specularly transmit nearly all of incident light, while an outer portion may be a half-mirror, or reflecting polarizer.

In the exemplary embodiment illustrated by FIG. 3, central portion 322 and first outer portion 324 both redirect light by about the same angle; however, each portion redirects in opposite directions (with reference to central optical axis 334). Likewise, first outer portion 324 and second outer portion 326 both redirect light by about the same angle; however, first outer portion 324 redirects light further off-axis (with reference to central optical axis 334).

FIGS. 4A-4D are a series of top plan views of exemplary light deflecting elements. FIGS. 4A-4D illustrate some exemplary configurations of light deflecting elements; in particular, geometries and relative sizes of central and outer portions of light deflecting elements. These have characteristic dimension r, where r is measured from where the central optical axis (indicated by the central dot) intersects the light deflecting element and extends the minimum distance to a boundary between the central portion and an outer portion. Note that the outer portion does not need to be proximate the entire outer edge of the light deflecting element.

FIGS. 5A-5D are a series of top plan views of exemplary configurations of light deflecting elements in an optical device. These figures illustrate a subset of the design possibilities available, which may be customized based on application-specific needs. The light deflectors shown are positioned with reference to the central optical axis, provided as a dot. Any number of light deflecting elements are possible, arranged in symmetric or asymmetric configurations. In some embodiments, the light deflecting elements may include curved portions. The selection and positioning of the light deflecting elements depend ultimately on the desired light output and application.

Applications for embodiments described herein include lamps and luminaires. Further, some embodiments may be useful for advertising purposes, such as for signage (either indoor or outdoor), commercial uses including illumination to draw attention to a particular product or to help locate a certain product on a shelf or in a cooler. Some embodiments may be useful to provide decorative light, such as along a path or along a wall. Some embodiments may be used at work lights, for example, head-mounted lighting for on-demand light in dark ambient environments, such as caves or mines.

The following are exemplary embodiments according to the present disclosure:

Item 1. An optical device, comprising:
a electrically switchable diffuser capable of having at least a first state and a second state;
at least one light deflecting element disposed proximate the electrically switchable diffuser; and
a collimated light source disposed proximate to the electrically switchable diffuser and opposite the light deflecting element;
wherein the collimated light source, in a powered state, is configured to produce an input light cone having a central optical axis and having a minimum angular width of not more than about 40 degrees;
wherein at least a portion of the light from the collimated light source is incident on the light deflecting element when the electrically switchable diffuser is in the second state but not the first state.

Item 2. The optical device of item 1, wherein the first state is a clear state.

Item 3. The optical device of item 1, wherein the collimated light source is configured to produce an input light cone having no angular width more than about 40 degrees.

Item 4. The optical device of item 1, wherein the electrically switchable diffuser and the at least one light deflecting element are not parallel.

Item 5. The optical device of item 1, wherein the electrically switchable diffuser includes smectic A.

Item 6. The optical device of item 1, wherein at least a portion of the electrically switchable diffuser is curved.

Item 7. The optical device of item 1, wherein at least a portion of the at least one light deflecting element is curved.

Item 8. The optical device of item 1, wherein the at least one light deflecting element includes a microstructured surface.

Item 9. The optical device of item 1, wherein the at least one light deflecting element includes a reflector.

Item 10. The optical device of item 1, wherein the at least one light deflecting element includes a diffuser.

Item 11. An optical device, comprising:
an electrically switchable diffuser capable of having at least a first state and a second state;
a substantially planar light deflecting element disposed proximate the electrically switchable diffuser; and
a collimated light source disposed proximate to the electrically switchable diffuser and opposite the light deflecting element;
wherein the collimated light source, in a powered state, is configured to produce an input light cone having a central optical axis and an angular width of not more than about 40 degrees;
wherein the light deflecting element includes a central portion with a minimum radius r, measured from the central optical axis to an edge of the central portion and an outer portion not including the central portion;
wherein the light deflecting element is disposed at a distance l from the switchable diffuser, measured along the central optical axis;
wherein the outer portion redirects incident light but the central portion is substantially non-redirecting for light from the collimated light source incident on the at least one light deflecting element; and
wherein l is greater than or substantially equal to r.

Item 12. The optical device of item 11, wherein the central portion includes air.

Item 13. The optical device of item 11, wherein l is greater than or substantially equal to 2r.

Item 14. The optical device of item 11, wherein the outer portion of the light deflecting element is proximate the entire outer edge of the light deflecting element.

Item 15. The optical device of item 11, further comprising a second outer portion not including the outer portion nor the central portion, wherein the second outer portion redirects incident light from the collimated light source.

Item 16. An optical device, comprising:
an electrically switchable diffuser capable of having at least a first state and a second state;
a substantially planar light deflecting element disposed proximate the electrically switchable diffuser; and
a collimated light source disposed proximate to the electrically switchable diffuser and opposite the light deflecting element;
wherein the collimated light source, in a powered state, is configured to produce an input light cone having a central optical axis and an angular width of not more than about 40 degrees;
wherein the light deflecting element includes a central portion and at least one outer portion not including the central portion, the central portion and the at least one outer portion at least partially sharing a boundary; and
wherein there is an abrupt change in light deflection of light incident on the light deflecting element from the collimated light source between the central portion and the at least one outer portion at the boundary.

Item 17. The optical device of item 16, wherein an abrupt change in light deflection means there is a discontinuous change in light scattering.

Item 18. The optical device of item 16, wherein an abrupt change in light deflection means there is a discontinuous change in light deflection direction relative to the central optical axis.

Item 19. The optical device of item 16, wherein an abrupt change in light deflection means there is a discontinuous change of more than 10 degrees in the angle of deflection.

Item 20. The optical device of item 16, wherein an abrupt change in light deflection means there is a discontinuous change of more than 10% in reflectivity.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical device, comprising:
   an electrically switchable diffuser capable of having at least a first state and a second state;
   at least one light deflecting element disposed proximate the electrically switchable diffuser, the light deflecting element including a central portion, and the central portion including air; and
   a light source disposed proximate to the electrically switchable diffuser and opposite the light deflecting element;
   wherein the light source, in a powered state, is configured to produce an input light cone having a central optical axis and having an angular width of not more than 40 degrees;
   wherein at least a portion of the light from the light source is incident on the light deflecting element when the electrically switchable diffuser is in the second state but not the first state.

2. The optical device of claim 1, wherein the first state is a clear state.

3. The optical device of claim 1, wherein the electrically switchable diffuser and the at least one light deflecting element are not parallel.

4. The optical device of claim 1, wherein at least a portion of the at least one light deflecting element is curved.

5. The optical device of claim 1, wherein the at least one light deflecting element includes a microstructured surface.

6. The optical device of claim 1, wherein the at least one light deflecting element includes a reflector.

7. An optical device, comprising:
   an electrically switchable diffuser capable of having at least a first state and a second state;
   a substantially planar light deflecting element disposed proximate the electrically switchable diffuser; and
   a light source disposed proximate to the electrically switchable diffuser and opposite the light deflecting element;
   wherein the light source, in a powered state, is configured to produce an input light cone having a central optical axis and an angular width of not more than 40 degrees;
   wherein the light deflecting element includes a central portion with a minimum radius r, measured from the central optical axis to an edge of the central portion and an outer portion not including the central portion;
   wherein the light deflecting element is disposed at a distance l from the switchable diffuser, measured along the central optical axis;
   wherein the outer portion redirects incident light but the central portion is substantially non-redirecting for light from the light source incident on the at least one light deflecting element;
   wherein l is greater than or substantially equal to r, and
   wherein the central portion includes air.

8. The optical device of claim 7, further comprising a second outer portion not including the outer portion nor the central portion, wherein the second outer portion redirects incident light from the light source.

9. An optical device, comprising:
   an electrically switchable diffuser capable of having at least a first state and a second state;
   a substantially planar light deflecting element disposed proximate the electrically switchable diffuser; and
   a light source disposed proximate to the electrically switchable diffuser and opposite the light deflecting element;
   wherein the light source, in a powered state, is configured to produce an input light cone having a central optical axis and an angular width of not more than 40 degrees;
   wherein the light deflecting element includes a central portion and at least one outer portion not including the central portion, the central portion and the at least one outer portion at least partially sharing a boundary;
   wherein there is an abrupt change in light deflection of light incident on the light deflecting element from the light source between the central portion and the at least one outer portion at the boundary, and
   wherein the central portion includes air.

* * * * *